(12) United States Patent
Nakano et al.

(10) Patent No.: US 12,055,329 B2
(45) Date of Patent: Aug. 6, 2024

(54) PIPE COUPLING STRUCTURE AND REFRIGERATION CYCLE APPARATUS

(71) Applicant: DAIKIN INDUSTRIES, LTD., Osaka (JP)

(72) Inventors: Hiroyuki Nakano, Osaka (JP); Atsushi Yamamoto, Osaka (JP); Shouta Agou, Osaka (JP); Ryo Koyama, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/382,555

(22) Filed: Oct. 23, 2023

(65) Prior Publication Data

US 2024/0044557 A1 Feb. 8, 2024

Related U.S. Application Data

(63) Continuation of application No. PCT/JP2022/019318, filed on Apr. 28, 2022.

(30) Foreign Application Priority Data

Apr. 28, 2021 (JP) .............................. JP2021-076060

(51) Int. Cl.
*F25B 41/40* (2021.01)
*F25B 39/00* (2006.01)

(52) U.S. Cl.
CPC .............. *F25B 41/40* (2021.01); *F25B 39/00* (2013.01)

(58) Field of Classification Search
CPC .......... F25B 41/40; F25B 41/42; F25B 39/00; F24F 1/26; F24F 1/32
See application file for complete search history.

(56) References Cited

U.S. PATENT DOCUMENTS

| 2015/0000332 A1* | 1/2015 | Michitsuji ............. F24F 1/0063 62/525 |
| 2016/0003488 A1* | 1/2016 | Nakatsu ................... F24F 1/32 137/375 |

(Continued)

FOREIGN PATENT DOCUMENTS

| JP | 10-141804 A | 5/1998 |
| JP | 2001-118480 A | 4/2001 |

(Continued)

OTHER PUBLICATIONS

International Search Report (PCT/ISA/210) issued in PCT/JP2022/019318 mailed on Jul. 12, 2022.

(Continued)

*Primary Examiner* — Henry T Crenshaw
*Assistant Examiner* — Kamran Tavakoldavani
(74) *Attorney, Agent, or Firm* — Birch, Stewart, Kolasch & Birch, LLP

(57) ABSTRACT

A heat transfer tube as a first refrigerant pipe has a first portion, a first expansion portion, a second portion, a second expansion portion, and a third portion arranged in order. A connecting tube as a second refrigerant pipe has a fourth portion facing the second portion and a fifth portion facing the third portion. The connecting tube is inserted into the heat transfer tube. The inner diameter of the second portion is larger than the inner diameter of the first portion, and the inner diameter of the third portion is larger than the inner diameter of the second portion. The outer diameter of the fifth portion is larger than the outer diameter of the fourth portion. The fifth portion and the third portion are brazed.

21 Claims, 5 Drawing Sheets

(56) References Cited

U.S. PATENT DOCUMENTS

| | | | |
|---|---|---|---|
| 2017/0153061 A1* | 6/2017 | Yoshioka | F28D 3/04 |
| 2020/0116400 A1* | 4/2020 | Kojima | F25B 41/40 |
| 2020/0300515 A1* | 9/2020 | Sun | F25B 39/00 |

FOREIGN PATENT DOCUMENTS

| | | | |
|---|---|---|---|
| JP | 2008-5898 A | | 1/2008 |
| JP | 2008-232201 A | | 10/2008 |
| JP | 2010-117115 A | | 5/2010 |
| JP | 2011-89710 A | | 5/2011 |
| JP | 2015-123496 A | | 7/2015 |
| JP | 2015-140998 A | | 8/2015 |
| JP | 2015-217400 A | | 12/2015 |
| JP | 3 101 353 A1 | | 12/2016 |
| JP | 2018-115774 A | | 7/2018 |
| WO | WO 2013/118762 A1 | | 8/2013 |

OTHER PUBLICATIONS

Written Opinion (PCT/ISA/237) issued in PCT/JP2022/019318 mailed on Jul. 12, 2022.
International Preliminary Report on Patentability and English translation of the Written Opinion of the International Searching Authority for International Application No. PCT/JP2022/019318, dated Nov. 9, 2023.

* cited by examiner

PIPE COUPLING STRUCTURE AND REFRIGERATION CYCLE APPARATUS

CROSS REFERENCE TO RELATED APPLICATIONS

This application is a Continuation of PCT International Application No. PCT/JP2022/019318, filed on Apr. 28, 2022, which claims priority under 35 U.S.C. § 119(a) to Patent Application No. JP 2021-076060, filed in Japan on Apr. 28, 2021, all of which are hereby expressly incorporated by reference into the present application.

TECHNICAL FIELD

The present disclosure relates to a pipe coupling structure in which refrigerant pipes are coupled to each other and a refrigeration cycle apparatus.

BACKGROUND ART

Conventionally, in a connection structure between a heat transfer tube and a pipe of a heat exchanger, there is a case where a method for inserting and brazing the pipe into the heat transfer tube is adopted. It has been conventionally required to ensure the strength of the coupling area between the heat transfer tube and the pipe, and the smaller the tube diameter of the heat transfer tube, the more important it is to ensure the strength of the coupling area.

SUMMARY

A pipe coupling structure according to one aspect includes: a first refrigerant pipe that has a first portion, a first expansion portion, a second portion, a second expansion portion, and a third portion arranged in order; and a second refrigerant pipe that is inserted into the first refrigerant pipe and has a fourth portion facing the second portion and a fifth portion facing the third portion. The second portion has an inner diameter larger than an inner diameter of the first portion, and the third portion has an inner diameter larger than the inner diameter of the second portion. The first expansion portion is an area of the first refrigerant pipe, an inner diameter of which gradually changes from the inner diameter of the first portion to the inner diameter of the second portion. The second expansion portion is an area of the first refrigerant pipe, an inner diameter of which gradually changes from the inner diameter of the second portion to the inner diameter of the third portion. The fifth portion has an outer diameter larger than an outer diameter of the fourth portion. The fifth portion and the third portion are brazed.

DESCRIPTION OF EMBODIMENT (1) Application of Pipe Coupling Structure

Figure 1:
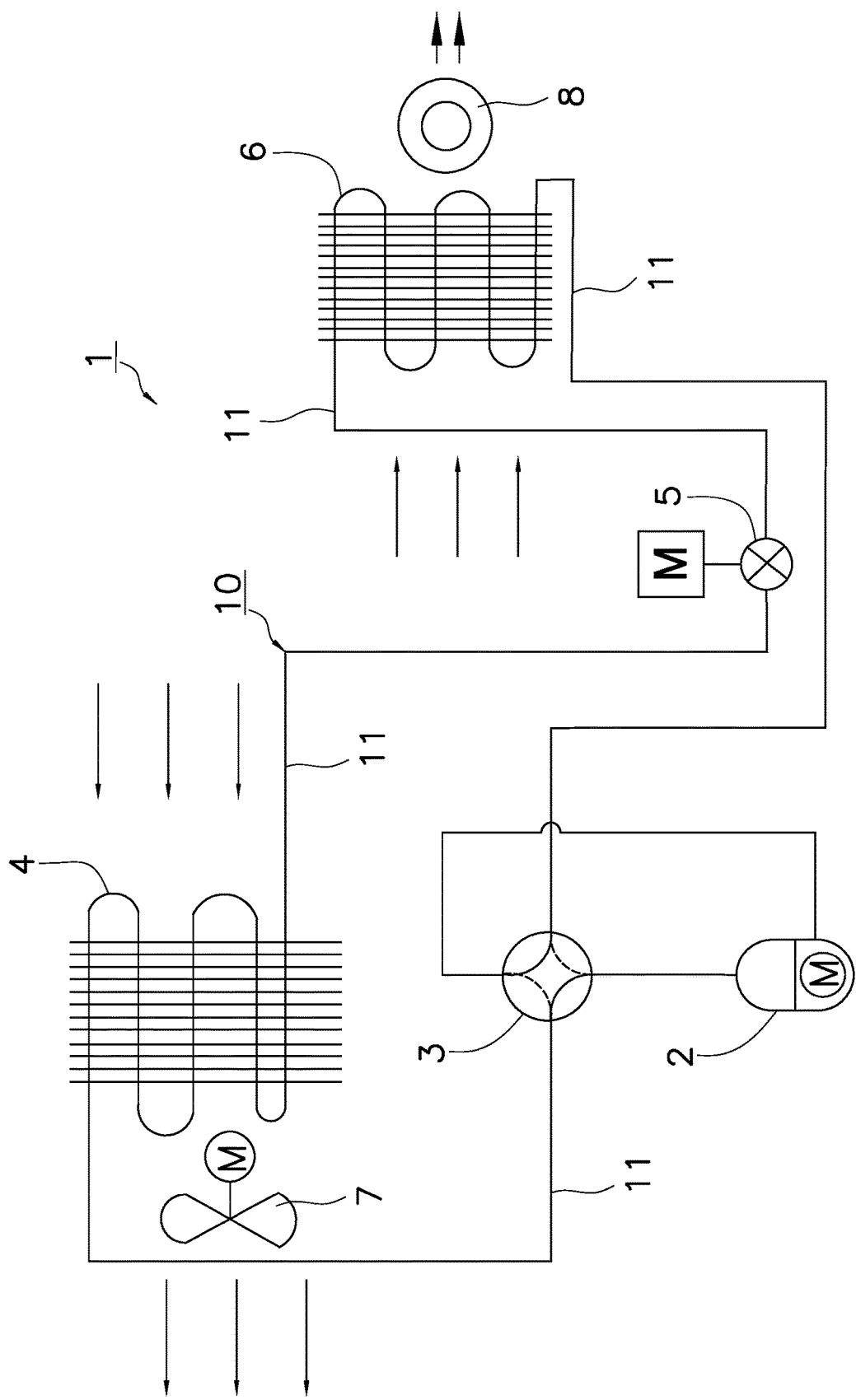
FIG. 1 is a circuit diagram illustrating an example of an air conditioner to which a pipe coupling structure is applied.

FIG. 1 illustrates an air conditioner 1 as an example of a refrigeration cycle apparatus to which a pipe coupling structure is applied. In the present disclosure, the case where the refrigeration cycle apparatus is the air conditioner 1 will be described, but the refrigeration cycle apparatus is not limited to the air conditioner 1. The refrigeration cycle apparatus is an apparatus that performs a refrigeration cycle. Examples of the refrigeration cycle apparatus include a refrigerator, a freezer, a water heater, a floor heating apparatus, and a heat pump apparatus.

The air conditioner 1 in FIG. 1 includes a compressor 2, a four-way valve 3, an outdoor heat exchanger 4, an expansion valve 5, an indoor heat exchanger 6, an outdoor fan 7, and an indoor fan 8.

The compressor 2, the four-way valve 3, the outdoor heat exchanger 4, the expansion valve 5, and the indoor heat exchanger 6 are connected by a communicating tube 11 to form a refrigerant circuit 10. In the refrigerant circuit 10, a refrigerant circulates and a vapor compression refrigeration cycle is repeated. In other words, the refrigerant circulates in the refrigerant circuit 10 while alternating between decompression expansion and heat dissipation condensation. Examples of the refrigerant used in the refrigerant circuit 10 in which the vapor compression refrigeration cycle is performed include a hydrofluorocarbon (HFC)-based refrigerant, a hydrofluoroolefin (HFO), an unsaturated HFC-based refrigerant, and a natural refrigerant. Examples of the HFC-based refrigerant include R32, R410A, R407C, and R134a. Examples of the HFO include R1234ze and R1234yf. The natural refrigerant is, for example, R717.

The flow path of the refrigerant flowing in the refrigerant circuit 10 is switched by the four-way valve 3. The air conditioner 1 can switch between cooling operation and heating operation by switching the flow path with the four-way valve 3. During the cooling operation, the refrigerant flows through the compressor 2, the four-way valve 3, the outdoor heat exchanger 4, the expansion valve 5, the indoor heat exchanger 6, the four-way valve 3, and then the compressor 2 in this order. During the heating operation, the refrigerant flows through the compressor 2, the four-way valve 3, the indoor heat exchanger 6, the expansion valve 5, the outdoor heat exchanger 4, the four-way valve 3, and then the compressor 2 in this order.

The outdoor heat exchanger 4 and the indoor heat exchanger 6 are fin-and-tube heat exchangers. During the cooling operation, the outdoor heat exchanger 4 functions as a condenser, and the indoor heat exchanger 6 functions as an evaporator. During the heating operation, the outdoor heat exchanger 4 functions as an evaporator, and the indoor heat exchanger 6 functions as a condenser.

(1-1) Outdoor Heat Exchanger 4

Figure 2:
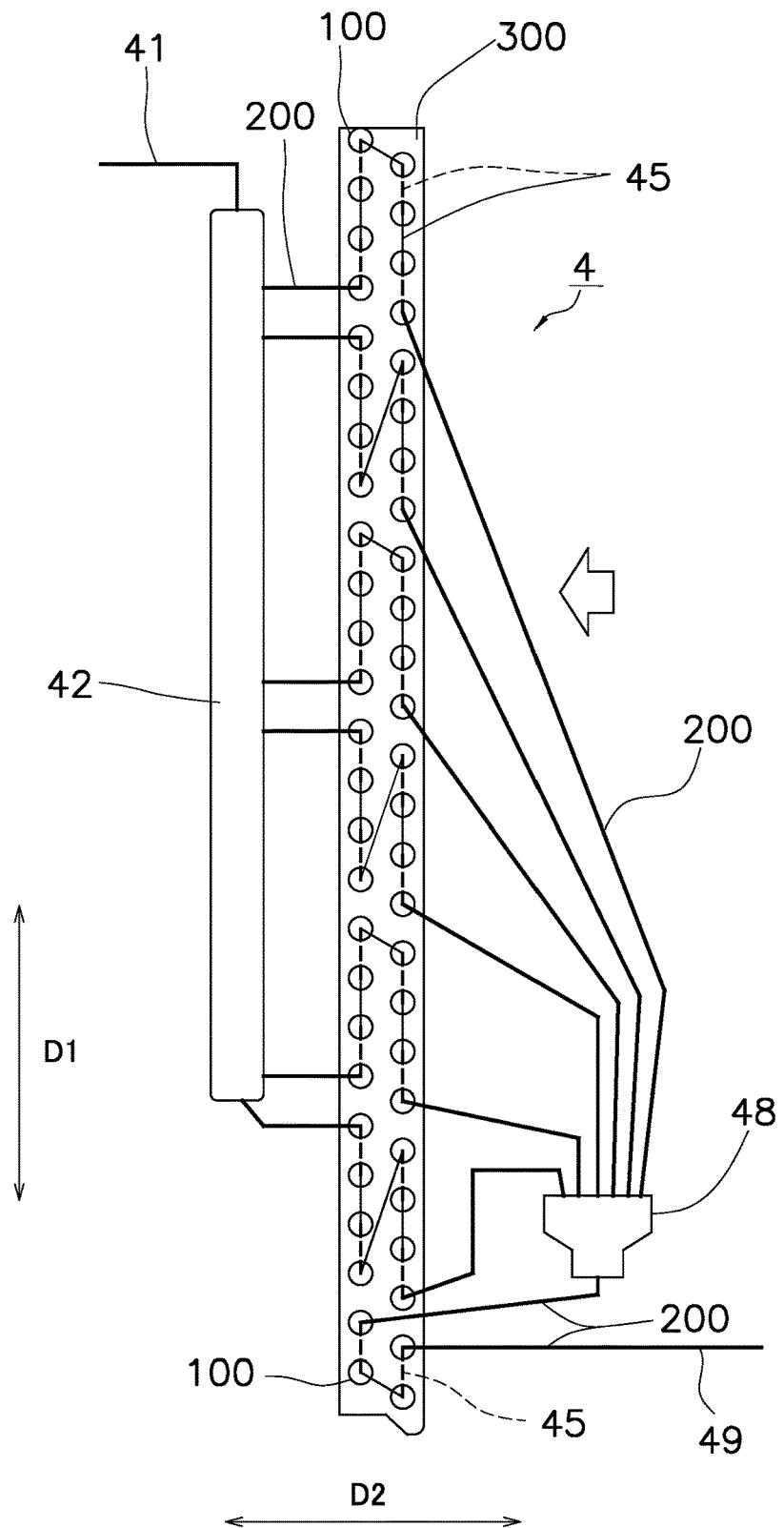
FIG. 2 is a schematic diagram illustrating an example of the configuration of an outdoor heat exchanger to which the pipe coupling structure is applied.

FIG. 2 schematically illustrates a configuration of the outdoor heat exchanger 4. The outdoor heat exchanger 4 includes a first inlet/outlet 41, a header collecting tube 42, a plurality of connecting tubes 200, a plurality of heat transfer tubes 100, a U-tube 45, a plurality of heat transfer fins 300, a flow divider 48, and a second inlet/outlet 49.

In the outdoor heat exchanger 4 functioning as a condenser, the refrigerant discharged from the compressor 2 enters the outdoor heat exchanger 4 through the first inlet/outlet 41. In the outdoor heat exchanger 4 functioning as an evaporator, the refrigerant subjected to heat exchange in the indoor heat exchanger 6 exits the outdoor heat exchanger 4 through the first inlet/outlet 41. Regardless of whether the outdoor heat exchanger 4 functions as a condenser or an evaporator, the refrigerant passing through the first inlet/outlet 41 is mainly gasified refrigerant.

The header collecting tube 42 is connected to the first inlet/outlet 41 and the plurality of connecting tubes 200. In the outdoor heat exchanger 4 functioning as a condenser, the refrigerant entering through the first inlet/outlet 41 is distributed by the header collecting tube 42 and flows into the plurality of connecting tubes 200. In the outdoor heat exchanger 4 functioning as an evaporator, the refrigerant flowing through the plurality of connecting tubes 200 merges at the header collecting tube 42 and flows into the first inlet/outlet 41. The connecting tubes 200 are connected to the heat transfer tubes 100. The 56 heat transfer tubes 100 of the outdoor heat exchanger 4, indicated by circles in FIG. 2, are arranged in 2 columns and 26 rows. The number and array of the heat transfer tubes 100 of the outdoor heat exchanger 4 to which the technology according to the present disclosure is applied are not limited to the array illustrated in FIG. 2. Note that the rows are aligned in the gravity direction D1, and the columns are aligned in the horizontal direction D2, as indicated by arrows in FIG. 2.

FIG. 2 illustrates a circular cross section of the heat transfer tubes 100. In other words, the heat transfer tubes 100 extend in a direction perpendicular to the paper surface of FIG. 2. The U-tube 45 is connected to the end of the heat transfer tube 100 to which the connecting tube 200 is not connected. The U-tube 45 connects two heat transfer tubes 100. The U-tube 45 allows the refrigerant flowing in one heat transfer tube 100 to turn around at the end of the outdoor heat exchanger 4 and flow into the other heat transfer tube 100. In FIG. 2, the U-tube 45 indicated by a solid line is disposed in the front, and the U-tube 45 indicated by a broken line is disposed in the back. All heat transfer tubes 100 penetrate vertically through the plurality of heat transfer fins 300. The plurality of heat transfer fins 300 are arranged such that the main surfaces thereof are parallel to each other.

The plurality of heat transfer tubes 100 and the flow divider 48 are connected by the plurality of connecting tubes 200. When the outdoor heat exchanger 4 in FIG. 2 functions as a condenser, the refrigerant flows into the flow divider 48 from six heat transfer tubes 100 through six connecting tubes 200. The refrigerant that has flowed into the flow divider 48 from the six connecting tubes 200 and merged at the flow divider 48 flows out from one connecting tube 200. In the outdoor heat exchanger 4 functioning as an evaporator, the refrigerant flowing into the flow divider 48 from one connecting tube 200 is distributed to the six connecting tubes 200 by the flow divider 48. Between one connecting tube 200 of the flow divider 48 and the second inlet/outlet 49, the plurality of heat transfer tubes 100, the plurality of U-tubes 45, and one connecting tube 200 are connected in series.

(1-2) Indoor Heat Exchanger 6

Figure 3:
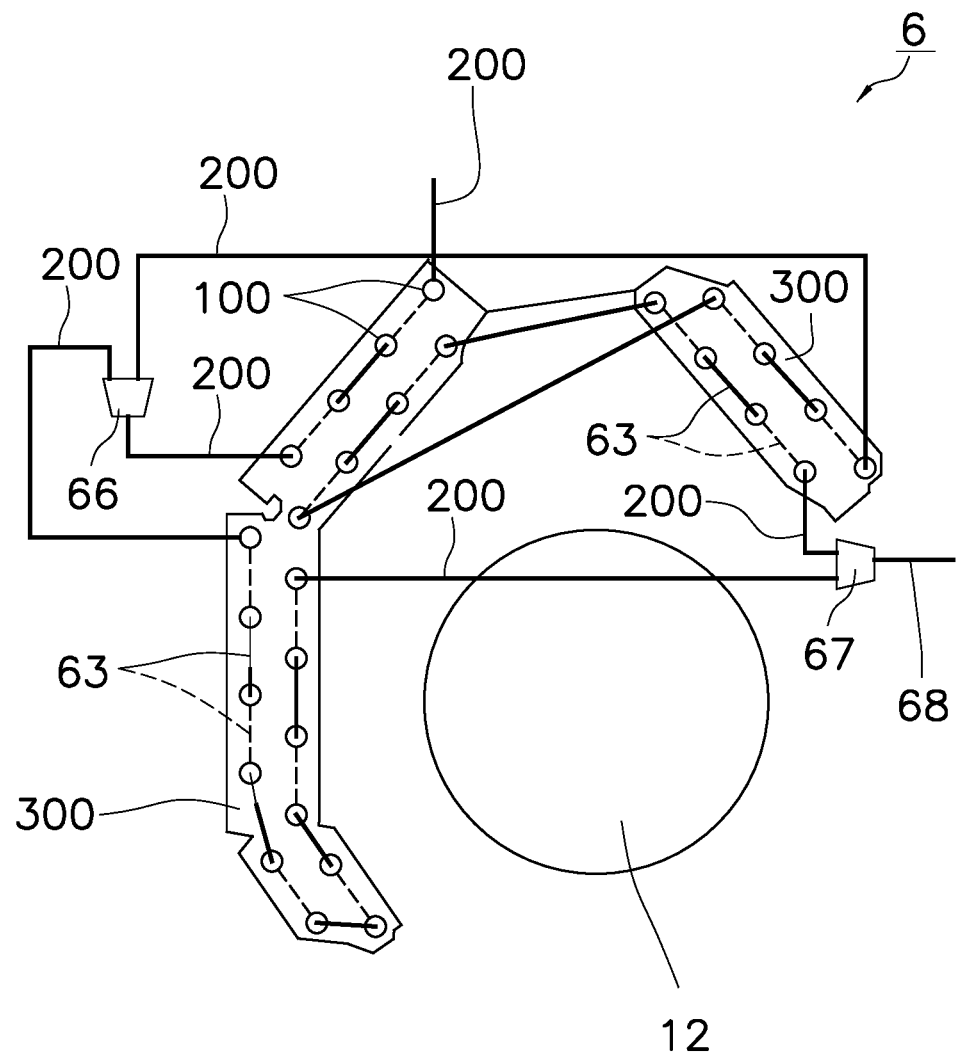
FIG. 3 is a schematic diagram illustrating an example of the configuration of an indoor heat exchanger to which the pipe coupling structure is applied.

FIG. 3 schematically illustrates a configuration of the indoor heat exchanger 6. The indoor heat exchanger 6 includes a connecting tube 200, a plurality of heat transfer tubes 100, a U-tube 63, a plurality of heat transfer fins 300, a plurality of connecting tubes 200, a first flow divider 66, a second flow divider 67, and an inlet/outlet pipe 68.

In the indoor heat exchanger 6 functioning as a condenser, the refrigerant discharged from the compressor 2 enters the heat transfer tubes 100 through the connecting tube 200. In the indoor heat exchanger 6 functioning as an evaporator, the refrigerant subjected to heat exchange in the indoor heat exchanger 6 exits the indoor heat exchanger 6 through the connecting tube 200. Regardless of whether the indoor heat exchanger 6 functions as a condenser or an evaporator, the refrigerant passing through the connecting tube 200 is mainly gasified refrigerant.

The connecting tube 200 is connected to the inlet/outlet (not illustrated) of the indoor heat exchanger 6 and the heat transfer tubes 100. The 28 heat transfer tubes 100 of the indoor heat exchanger 6, indicated by circles in FIG. 3, are arranged in two columns. The number and array of the heat transfer tubes 100 of the indoor heat exchanger 6 to which the technology according to the present disclosure is applied are not limited to the array illustrated in FIG. 3. Note that the indoor heat exchangers 6 are arranged in rows close to and far from a cross-flow fan 12 in FIG. 3.

FIG. 3 illustrates a circular cross section of the heat transfer tubes 100. In other words, the heat transfer tubes 100 extend in a direction perpendicular to the paper surface of FIG. 3. The U-tube 63 is connected to the end of the heat transfer tube 100 to which the connecting tube 200 is not connected. The U-tube 63 connects two heat transfer tubes 100. The U-tube 63 allows the refrigerant flowing in one heat transfer tube 100 to turn around at the end of the indoor heat exchanger 6 and flow into the other heat transfer tube 100.

In FIG. 3, the U-tube 63 indicated by a solid line is disposed in the front, and the U-tube 63 indicated by a broken line is disposed in the back. All heat transfer tubes 100 penetrate vertically through the plurality of heat transfer fins 300. The plurality of heat transfer fins 300 are arranged such that the main surfaces thereof are parallel to each other.

One heat transfer tube 100 and the first flow divider 66 are connected by one connecting tube 200. When the indoor heat exchanger 6 in FIG. 3 functions as a condenser, the refrigerant flows into the first flow divider 66 from one heat transfer tube 100 through one connecting tube 200. The refrigerant flows into the first flow divider 66 from one connecting tube 200 and is distributed to two connecting tubes 200 by the first flow divider 66. In the indoor heat exchanger 6 functioning as an evaporator, the refrigerant flowing into the first flow divider 66 from two connecting tubes 200 merges at the first flow divider 66 and flows out from one connecting tube 200 into the heat transfer tube 100.

Between the two connecting tubes 200 connected to the first flow divider 66 and the two connecting tubes 200 connected to the second flow divider 67, two flow paths are formed by the plurality of heat transfer tubes 100 and the plurality of U-tubes 63 connected in series.

Two heat transfer tubes 100 and the second flow divider 67 are connected by the two connecting tubes 200. When the indoor heat exchanger 6 illustrated in FIG. 3 functions as an evaporator, the refrigerant flowing into the second flow divider 67 from one inlet/outlet pipe 68 is distributed to the two connecting tubes 200 by the second flow divider 67, and flows out from the two connecting tubes 200 to the two heat transfer tubes 100. When the indoor heat exchanger 6 functions as a condenser, the refrigerant flows into the second flow divider 67 from the two heat transfer tubes 100 through the two connecting tubes 200. The refrigerant flowing into the second flow divider 67 from the two connecting tubes 200 merges at the first flow divider 66 and flows out from one inlet/outlet pipe 68.

(1-3) Outline of Pipe Coupling Structure

Figure 4:
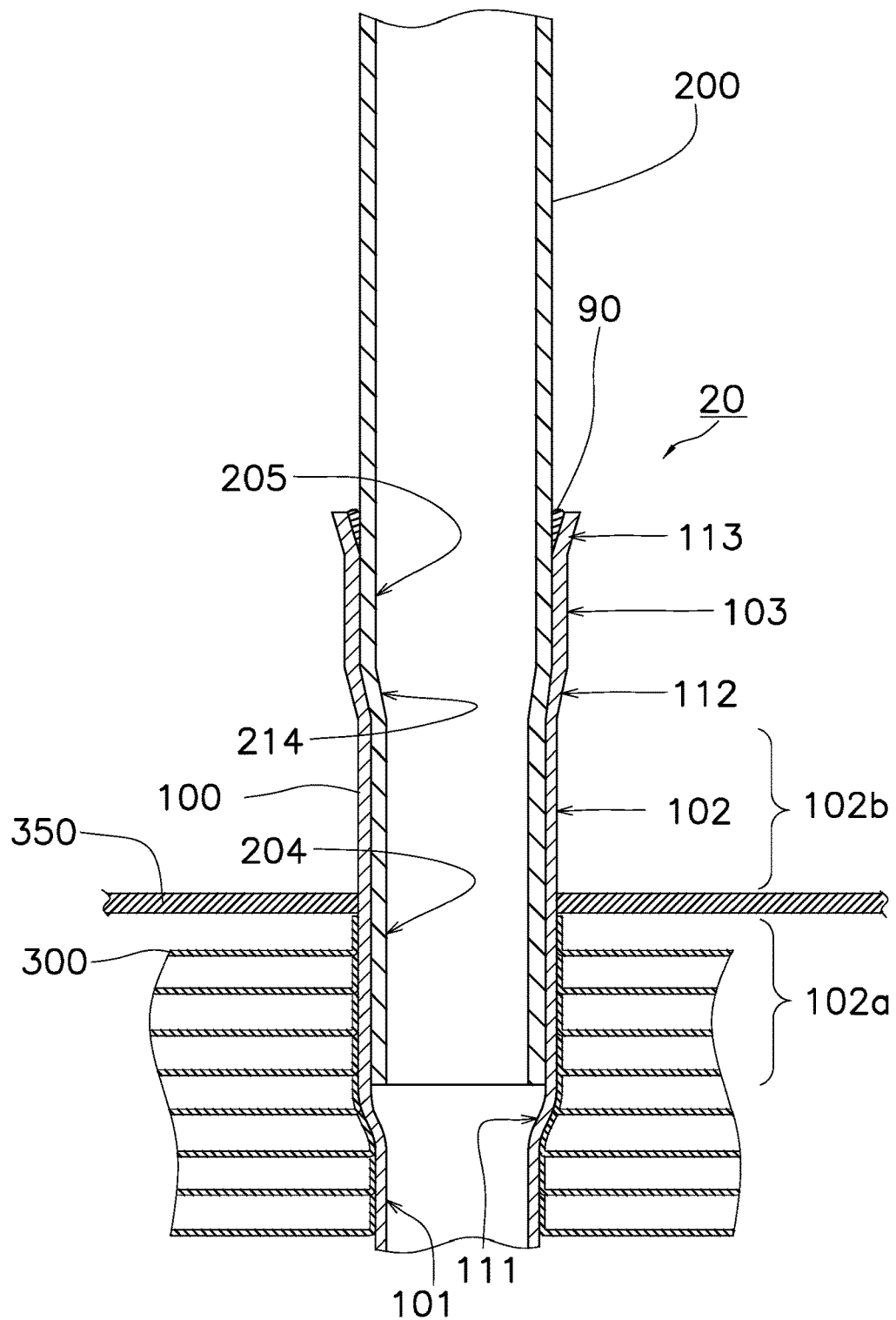
FIG. 4 is an enlarged cross-sectional view illustrating an example of the pipe coupling structure, heat transfer fins, and a tube plate.
Figure 5:
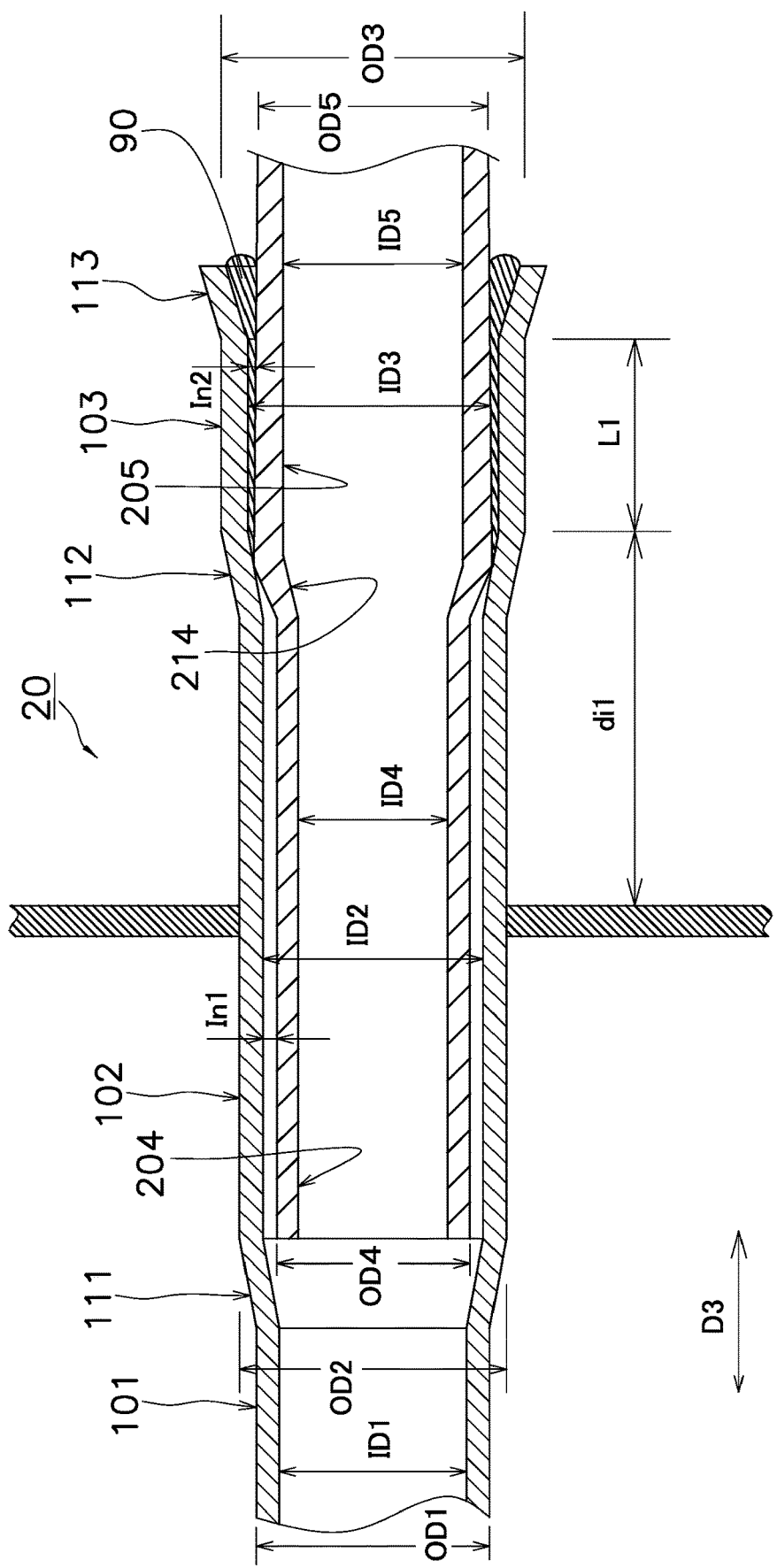
FIG. 5 is an enlarged cross-sectional view illustrating an example of the pipe coupling structure.

FIG. 4 illustrates a cross section of a pipe coupling structure 20. The pipe coupling structure 20 is the structure of the area where a heat transfer tube 100 and a connecting tube 200 are coupled together. The heat transfer tube 100 is a first refrigerant pipe having a first portion 101, a first expansion portion 111, a second portion 102, a second expansion portion 112, and a third portion 103 arranged in order. The heat transfer tube 100 is expanded in the first stage from the first portion 101 through the first expansion portion 111 to the second portion 102. Furthermore, the heat transfer tube 100 is expanded in the second stage from the second portion 102 through the second expansion portion 112 to the third portion 103. This two-stage expansion of the heat transfer tube 100 is performed, for example, by flaring. The connecting tube 200 is inserted into the heat transfer tube 100 serving as the first refrigerant pipe. The connecting tube 200 is a second refrigerant pipe having a fourth portion 204 that faces the second portion 102 of the heat transfer tube 100 and a fifth portion 205 that faces the third portion 103 of the heat transfer tube 100.

An inner diameter ID2 of the second portion 102 of the heat transfer tube 100 is larger than an inner diameter ID1 of the first portion 101. In addition, an inner diameter ID3 of the third portion 103 of the heat transfer tube 100 is larger than the inner diameter ID2 of the second portion 102. An outer diameter OD2 of the second portion 102 is larger than an outer diameter OD1 of the first portion 101. In addition, an outer diameter OD3 of the third portion 103 is larger than the outer diameter OD2 of the second portion 102. Furthermore, the thickness of the heat transfer tube 100 is the same in the first portion 101, the second portion 102, and the third portion 103. The first expansion portion 111 of the heat transfer tube 100 is the area of the heat transfer tube 100, the inner diameter of which gradually changes from the inner diameter ID1 of the first portion 101 to the inner diameter ID2 of the second portion 102. The second expansion portion 112 of the heat transfer tube 100 is the area of the heat transfer tube 100, the inner diameter of which gradually changes from the inner diameter ID2 of the second portion 102 to the inner diameter ID3 of the third portion 103.

An outer diameter OD5 of the fifth portion 205 of the connecting tube 200 is larger than an outer diameter OD4 of the fourth portion 204. In addition, an inner diameter ID5 of the fifth portion 205 of the connecting tube 200 is larger than an inner diameter ID4 of the fourth portion 204. Furthermore, the thickness of the connecting tube 200 is the same in the fourth portion 204 and the fifth portion 205. The fourth portion 204 of the connecting tube 200 is formed, for example, by narrowing the outer diameter OD5 of the fifth portion 205 to the outer diameter OD4. For example, the fourth portion 204 can be narrowed by swaging the fourth portion 204.

The heat transfer tube 100 is formed from, for example, aluminum, an aluminum alloy, or copper. The heat transfer tube 100 formed from aluminum or aluminum alloy is preferable in that the weight of the outdoor heat exchanger 4 or the indoor heat exchanger 6 can be reduced. In addition, the connecting tube 200 is formed from, for example, aluminum, an aluminum alloy, or copper. The connecting tube 200 formed from aluminum or aluminum alloy is preferable in that the weight of the outdoor heat exchanger 4 or the indoor heat exchanger 6 can be reduced. The thickness of the heat transfer tube 100 (first refrigerant pipe) is thinner than the thickness of the connecting tube 200 (second refrigerant pipe). This thin-walled heat transfer tube 100 is reinforced by the overlap with the connecting tube 200.

In the pipe coupling structure 20, the fifth portion 205 of the connecting tube 200 and the third portion 103 of the heat transfer tube 100 are brazed together. The total length of the second portion 102, the second expansion portion 112, and the third portion 103 is, for example, within the range of 15 mm to 25 mm. The length of the third portion 103 is, for example, within the range of 3 mm to 10 mm. The end of the fourth portion 204 is preferably inserted to the vicinity of the boundary between the first expansion portion 111 and the second portion 102. The length of the second portion 102 of the heat transfer tube 100 is longer than the length of the fourth portion 204 of the connecting tube 200.

(2) Detailed Configuration of Pipe Coupling Structure 20

A first gap In1 between the second portion 102 of the heat transfer tube 100 and the fourth portion 204 of the connecting tube 200 is larger than a second gap In2 between the third portion 103 of the heat transfer tube 100 and the fifth portion 205 of the connecting tube 200. By making the first gap In1 larger than the second gap In2, it is easier to insert the connecting tube 200 into the heat transfer tube 100.

The heat transfer tube 100 has a third expansion portion 113 connected to the third portion 103 and expanded in a tapered shape from the third portion 103. Since the third expansion portion 113 is expanded in the tapered shape, the gap between the third expansion portion 113 and the fifth portion 205 of the connecting tube 200 is even wider than the second gap In2. A brazing filler metal 90 is poured through the gap between the expanded third expansion portion 113 and the fifth portion 205. The tapered expansion of the third expansion portion 113 facilitates brazing.

As illustrated in FIG. 4, the entire first portion 101 of the heat transfer tube 100 penetrates the heat transfer fins 300. In addition, part 102a of the second portion 102 of the heat transfer tube 100 penetrates the heat transfer fins 300. The part 102a of the second portion 102 is the area of the second portion 102 which is closer to the first expansion portion 111 than the second expansion portion 112. The other part 102b of the second portion 102 is the area of the second portion 102 other than the part 102a and the tube plate 350. The other part 102b of the second portion 102 is the area of the second portion 102 closer to the second expansion portion 112. The other part 102b of the second portion 102 is not in contact with the heat transfer fins 300. In addition, the third portion 103 of the heat transfer tube 100 is also not in contact with the heat transfer fins 300. As illustrated in FIG. 4, the second portion 102 of the heat transfer tube 100 is in contact with the tube plate 350. More specifically, the second portion 102 is in contact with the tube plate 350 between the part 102a and the other part 102b of the second portion 102.

A distance di1 along the tube axis direction D3 from the third portion 103 to the tube plate 350 is greater than a length L1 of the third portion 103 along the tube axis direction D3. In addition, the distance di1 along the tube axis direction D3 from the third portion 103 to the tube plate 350 is greater than the outer diameter OD3 of the third portion 103.

The ratio of the inner diameter ID3 of the third portion 103 to the inner diameter ID2 of the second portion 102 is smaller than the ratio of the inner diameter ID1 of the second portion 102 to the inner diameter ID2 of the first portion 101. In other words, the relationship of (ID3/ID2)<(ID2/ID1) holds. It is preferable that 1.02≥ID3/ID2≥1.08. In addition, the ratio of the outer diameter OD3 of the third portion 103 to the outer diameter OD2 of the second portion 102 is smaller than the ratio of the outer diameter OD2 of the second portion 102 to the outer diameter OD1 of the first portion 101. In other words, the relationship of (OD3/OD2)<(OD2/OD1) holds. The inner diameter ID1 of the first portion 101 is 5 mm or less.

The connecting tube 200 has a fourth expansion portion 214 between the fourth portion 204 and the fifth portion 205. The fourth expansion portion 214 is the area of the connecting tube 200, the outer diameter of which gradually changes from the outer diameter OD4 of the fourth portion 204 to the outer diameter OD5 of the fifth portion 205. The fourth expansion portion 214 is in contact with the second expansion portion 112.

The contact between the fourth expansion portion 214 and the second expansion portion 112 enables positioning of the heat transfer tube 100 and the connecting tube 200 in the tube axis direction D3. In addition, the contact between the fourth expansion portion 214 and the second expansion portion 112 prevents the brazing filler metal 90 from entering the first gap In1 between the second portion 102 of the heat transfer tube 100 and the fourth portion 204 of the connecting tube 200. Therefore, the inner surface of the second portion 102 and the outer surface of the fourth portion 204 are not brazed.

(3) Features (3-1)

In the pipe coupling structure 20, the second portion 102 of the heat transfer tube 100 serving as a first refrigerant pipe and the fourth portion 204 of the connecting tube 200 serving as a second refrigerant pipe face each other. In this manner, the second portion 102 and the fourth portion 204 face each other, thereby allowing an improvement in the strength of the coupling area. The third portion 103 of the heat transfer tube 100 and the fifth portion 205 of the connecting tube 200 are brazed together, but the second portion 102 of the heat transfer tube 100 and the fourth portion 204 of the connecting tube 200 are not brazed. Thus, the pipe coupling structure 20 can prevent defects caused by an increase in the brazed area.

(3-2)

In the pipe coupling structure 20, the first gap In1 between the second portion 102 of the heat transfer tube 100 and the fourth portion 204 of the connecting tube 200 is larger than the second gap In2 between the third portion 103 of the heat transfer tube 100 and the fifth portion 205 of the connecting tube 200. This structure makes it easier to insert the fourth portion 204 of the connecting tube 200 into the second portion 102 of the heat transfer tube 100, and to couple the pipes.

(3-3)

The third expansion portion 113 of the pipe coupling structure 20 is expanded in a tapered shape from the third portion 103. The third expansion portion 113, which is expanded in the tapered shape in this manner, facilitates the insertion of the connecting tube 200 into the heat transfer tube 100. In addition, the brazing filler metal 90 can be easily poured through the third expansion portion 113 expanded in the tapered shape.

(3-4)

In the pipe coupling structure 20, the first refrigerant pipe is the heat transfer tube 100 of the outdoor heat exchanger 4 or the indoor heat exchanger 6. The first portion 101 and the part 102a of the second portion 102 of the heat transfer tube 100 penetrate the heat transfer fins 300. With this structure, the first portion 101 and the part 102a of the second portion 102 are supported by the heat transfer fins 300. As a result, the stress on the first portion 101 of the heat transfer tube 100 caused by the stress on the connecting tube 200 serving as the second refrigerant pipe can be reduced. The reduced stress on the first portion 101 makes it less likely to occur the damage in the pipe coupling structure 20.

(3-5)

In the pipe coupling structure 20, the second portion 102 is in contact with the tube plate 350 of the outdoor heat exchanger 4 or the indoor heat exchanger 6. The second portion 102 is a non-brazed area, and even if the tube plate 350 is in contact with the second portion 102, defects such as difficulty in brazing due to escape of heat during brazing to the tube plate 350 are less likely to occur. Even if heat is transferred from the first portion 101 to the second portion 102 by brazing in the first portion 101, heat escapes to the tube plate 350, thereby allowing a reduction in the risk of deterioration of the heat transfer fins 300 due to exposure to the heat of brazing.

(3-6)

In the pipe coupling structure 20, the other part 102b of the second portion 102 and the third portion 103 are not in contact with the heat transfer fins 300. Since the pipe coupling structure 20 has this structure, it is possible to prevent heat from escaping to the heat transfer fins 300 during the brazing of the third portion 103. As a result, it becomes easier to perform good brazing between the third portion 103 of the heat transfer tube 100 and the fifth portion 205 of the connecting tube 200.

(3-7)

In the pipe coupling structure 20, the distance di1 along the tube axis direction D3 from the third portion 103 to the tube plate 350 is greater than the length L1 of the third portion 103 along the tube axis direction D3. Since the distance di1 from the third portion 103 to the tube plate 350 makes it difficult for the brazing heat to be transferred to the heat transfer fins 300, it is possible to suppress the deterioration of the heat transfer fins 300 due to the influence of the brazing heat.

(3-8)

In the pipe coupling structure 20, the distance di1 along the tube axis direction D3 from the third portion 103 to the tube plate 350 is greater than the outer diameter OD3 of the third portion 103. Since the distance di1 from the third portion 103 to the tube plate 350 makes it difficult for the brazing heat to be transferred to the heat transfer fins 300, it is possible to suppress the deterioration of the heat transfer fins 300 due to the influence of the brazing heat.

(3-9)

External stress may be applied to the connecting tube 200 connected to the second inlet/outlet 49 of the outdoor heat exchanger 4 in FIG. 2 and the connecting tube 200 connected to the inlet/outlet (not illustrated) of the indoor heat exchanger 6 in FIG. 3. However, such connecting tube 200 connected to the outlet or inlet is reinforced by the pipe coupling structure 20, which contributes to improvement of the durability of the outdoor heat exchanger 4 or the indoor heat exchanger 6.

(3-10)

The thickness of the heat transfer tube 100 serving as the first refrigerant pipe is thinner than the thickness of the connecting tube 200 serving as the second refrigerant pipe. By reducing the thickness of the heat transfer tube 100, the heat of the refrigerant is more easily transferred to the heat transfer fins 300, and the performance of the outdoor heat exchanger 4 and the indoor heat exchanger 6 can be improved. Meanwhile, the decrease in the strength of the heat transfer tube 100 having a thinner wall thickness can be compensated for by overlapping with the connecting tube 200 having a thicker wall thickness.

(3-11)

In the pipe coupling structure 20, the ratio of the inner diameter ID3 of the third portion 103 to the inner diameter ID2 of the second portion 102 is smaller than the ratio of the inner diameter ID2 of the second portion 102 to the inner diameter ID1 of the first portion 101. As described above, the tube expansion rate (ID3/ID2) from the second portion 102 to the third portion 103 is reduced to such an extent that allows positioning when inserting the connecting tube 200 into the heat transfer tube 100, so that the heat transfer tube 100 and the connecting tube 200 are easy to manufacture.

(3-12)

In the pipe coupling structure 20, the inner diameter ID1 of the first portion 101 is 5 mm or less. Even if the thin heat transfer tube 100 of 5 mm or less is used, the pipe coupling structure 20 requires only a small amount of drawing, and can suppress an increase in pressure loss caused by the flow of the refrigerant and the generation of refrigerant noise.

(3-13)

In the pipe coupling structure 20, the fourth expansion portion 214 of the connecting tube 200 serving as the second refrigerant pipe is in contact with the second expansion portion 112 of the heat transfer tube 100 serving as the first refrigerant pipe. Positioning by the contact between the fourth expansion portion 214 and the second expansion portion 112 enables accurate positioning.

(3-14)

The length of the second portion 102 of the heat transfer tube 100 is longer than the length of the fourth portion 204 of the connecting tube 200. With this structure, when inserting the connecting tube 200 into the heat transfer tube 100, the fourth expansion portion 214 of the connecting tube 200 abuts on the second expansion portion 112 of the heat transfer tube 100 before the leading end of the fourth portion 204 abuts on the first expansion portion 111 of the heat transfer tube 100. As described above, since the second portion 102 is longer than the fourth portion 204, it is possible to prevent a situation in which the connecting tube 200 cannot be sufficiently inserted into the heat transfer tube 100.

(3-15)

If the heat transfer tube 100 is formed from aluminum or an aluminum alloy, the strength of the soft aluminum or aluminum alloy can be reinforced by the second portion 102 and the fourth portion 204 that face each other and the third portion 103 and the fifth portion 205 that face each other, while using lightweight aluminum or aluminum alloy, thereby making it less likely to cause damage. Similarly, if the connecting tube 200 is formed from aluminum or an aluminum alloy, the strength of the soft aluminum or aluminum alloy can be reinforced by the second portion 102 and the fourth portion 204 that face each other and the third portion 103 and the fifth portion 205 that face each other, while using lightweight aluminum or aluminum alloy, thereby making it less likely to cause damage. In particular, if the heat transfer tube 100 and the connecting tube 200 are formed from the same aluminum or the same aluminum alloy, the electrolytic corrosion that occurs between dissimilar metals can be prevented.

Although the embodiment of the present disclosure have been described above, it will be understood that various changes in form and details can be made without departing from the spirit and scope of the present disclosure described in the claims.

REFERENCE SIGNS LIST

1: air conditioner (example of refrigeration cycle apparatus)
4: outdoor heat exchanger (example of heat exchanger)
6: indoor heat exchanger (example of heat exchanger)
20: pipe coupling structure
100: heat transfer tube (example of first refrigerant pipe)
101: first portion
102: second portion
102a: part of second portion
102b: other part of second portion
103: third portion
111: first expansion portion
112: second expansion portion
113: third expansion portion
200: connecting tube (example of second refrigerant pipe)
204: fourth portion
205: fifth portion
214: fourth expansion portion
300: heat transfer fin
350: tube plate

CITATION LIST

Patent Literature

Patent Literature 1: JP 2001-116480 A

The invention claimed is:

1. A pipe coupling structure comprising:
a first refrigerant pipe that has a first portion, a first expansion portion, a second portion, a second expansion portion, and a third portion arranged in order; and
a second refrigerant pipe that is inserted into the first refrigerant pipe, has a fourth portion facing the second portion and a fifth portion facing the third portion, and has a fourth expansion portion between the fourth portion and the fifth portion, wherein
the second portion has an inner diameter larger than an inner diameter of the first portion, and the third portion has an inner diameter larger than the inner diameter of the second portion,
the first expansion portion is an area of the first refrigerant pipe, an inner diameter of which gradually changes from the inner diameter of the first portion to the inner diameter of the second portion,
the second expansion portion is an area of the first refrigerant pipe, an inner diameter of which gradually changes from the inner diameter of the second portion to the inner diameter of the third portion,
the fourth expansion portion is an area of the second refrigerant pipe, an outer diameter of which gradually changes from the outer diameter of the fourth portion to the outer diameter of the fifth portion,
the fourth expansion portion is in contact with the second expansion portion,
the outer diameter of the fifth portion is larger than the outer diameter of the fourth portion, and
the fifth portion and the third portion are solder material.

2. The pipe coupling structure according to claim 1, wherein
a first gap between the second portion and the fourth portion is larger than a second gap between the third portion and the fifth portion.

3. The pipe coupling structure according to claim 1, wherein
the first refrigerant pipe has a third expansion portion connected to the third portion and expanded in a tapered shape from the third portion.

4. The pipe coupling structure according to claim 1, wherein
the first refrigerant pipe is a heat transfer tube of a heat exchanger, and the first portion and part of the second portion penetrate a heat transfer fin.

5. The pipe coupling structure according to claim 4, wherein
the second portion is in contact with a tube plate of the heat exchanger.

6. The pipe coupling structure according to claim 4, wherein
the other part of the second portion and the third portion are not in contact with the heat transfer fin.

7. The pipe coupling structure according to claim 5, wherein
a distance along a tube axis direction from the third portion to the tube plate is greater than a length of the third portion along the tube axis direction.

8. The pipe coupling structure according to claim 5, wherein
a distance along a tube axis direction from the third portion to the tube plate is greater than an outer diameter of the third portion.

9. The pipe coupling structure according to claim 4, wherein
the second refrigerant pipe is disposed at an outlet or inlet of the heat exchanger.

10. The pipe coupling structure according to claim 4, wherein
the first refrigerant pipe has a thickness smaller than a thickness of the second refrigerant pipe.

11. The pipe coupling structure according to claim 1, wherein
a ratio of the inner diameter of the third portion to the inner diameter of the second portion is smaller than a ratio of the inner diameter of the second portion to the inner diameter of the first portion.

12. The pipe coupling structure according to claim 1, wherein
the inner diameter of the first portion is 5 mm or less.

13. The pipe coupling structure according to claim 1, wherein
the second portion has a length longer than a length of the fourth portion.

14. The pipe coupling structure according to claim 1, wherein
at least one of the first refrigerant pipe and the second refrigerant pipe is formed from aluminum or an aluminum alloy.

15. A refrigeration cycle apparatus comprising:
a refrigerant circuit through which a refrigerant circulates; and
the pipe coupling structure according to claim 1, provided in the refrigerant circuit.

16. The pipe coupling structure according to claim 2, wherein
the first refrigerant pipe has a third expansion portion connected to the third portion and expanded in a tapered shape from the third portion.

17. The pipe coupling structure according to claim 2, wherein
the first refrigerant pipe is a heat transfer tube of a heat exchanger, and the first portion and part of the second portion penetrate a heat transfer fin.

18. The pipe coupling structure according to claim 3, wherein
the first refrigerant pipe is a heat transfer tube of a heat exchanger, and the first portion and part of the second portion penetrate a heat transfer fin.

19. The pipe coupling structure according to claim 5, wherein
the other part of the second portion and the third portion are not in contact with the heat transfer fin.

20. The pipe coupling structure according to claim 5, wherein
the second refrigerant pipe is disposed at an outlet or inlet of the heat exchanger.

21. The pipe coupling structure according to claim 1, wherein
the fourth portion is positioned on an insertion direction side of the fifth portion, wherein the insertion direction is a direction of an insertion of the second refrigerant pipe into the first refrigerant pipe.

* * * * *